Patented Aug. 19, 1930

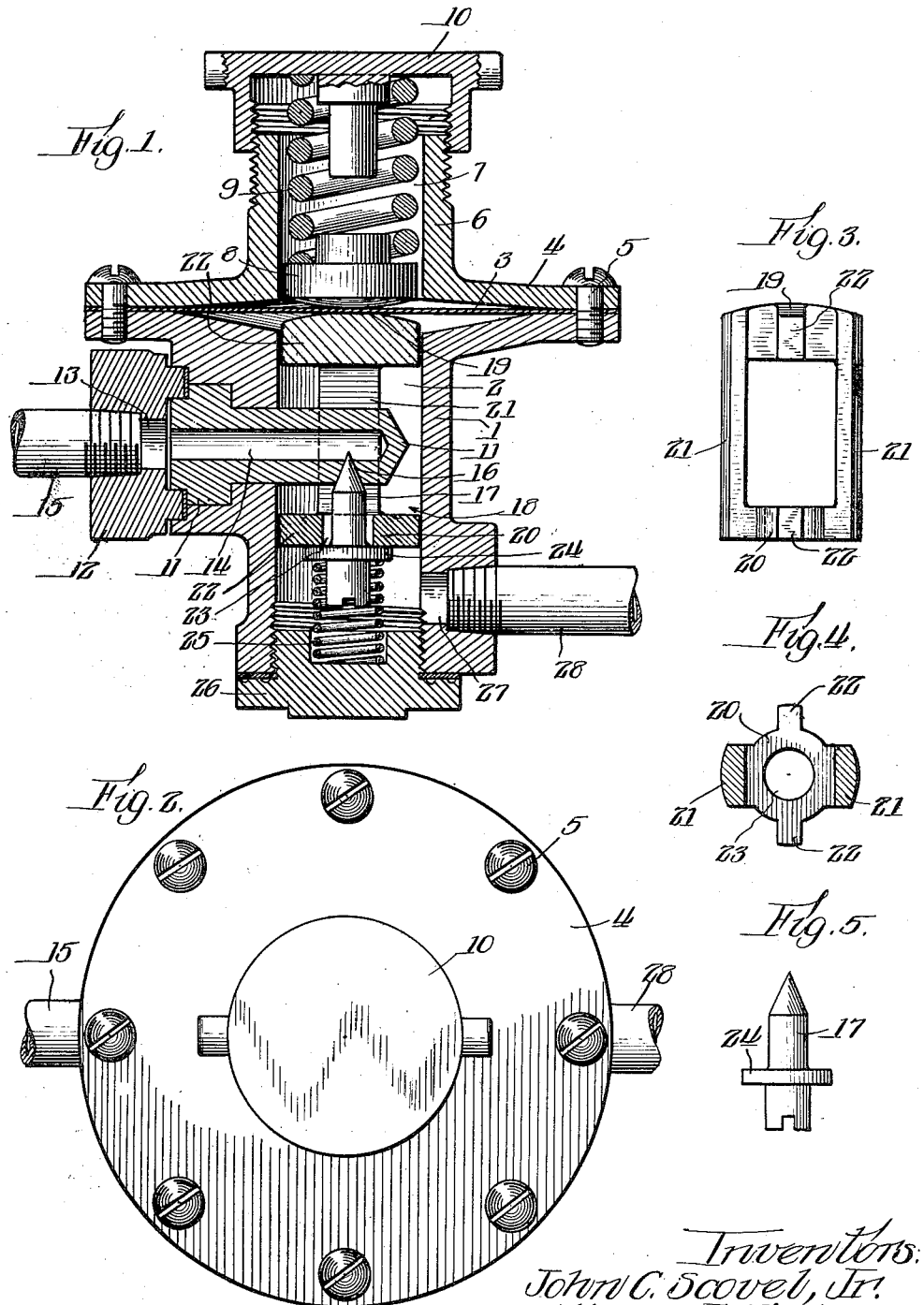

1,773,604

UNITED STATES PATENT OFFICE

JOHN C. SCOVEL, JR., AND WILLIAM J. O'BRIEN, OF CHICAGO, ILLINOIS, ASSIGNORS TO THE CREAMERY PACKAGE MFG. COMPANY, OF CHICAGO, ILLINOIS, A CORPORATION OF ILLINOIS

AUTOMATIC EXPANSION VALVE

Application filed July 8, 1926. Serial No. 121,085.

The invention relates more particularly to valves for the automatic regulation of the supply of refrigerant to the evaporating coils in mechanical refrigerating systems.

Valves used to control the flow of refrigerant and other highly volatile fluids require nice adjustment between the valve and its seat for satisfactory operation in the maintenance of uniform pressures in the piping or other reservoir supplied thereby, particularly as, in the use of such fluids, slight variations in the opening of the valve aperture causes material fluctuation in the pressures produced by the expansion of the fluid flowing therefrom.

It is the principal object of this invention to provide a valve construction in which the valve is positively controlled with respect to its operative movement in relation to its seat, but at the same time is free for self-adjustment into accurate alinement with the seat to assure a complete sealing of the valve aperture when the valve is in seated position, and to prevent the uneven wear of the valve or seat on account of uneven seating.

Other objects and advantages will be apparent in the following detailed description of a preferred embodiment of the invention which we have chosen for illustration in the accompanying drawings. It will be understood, however, that various changes in form, construction and arrangement may be made by those skilled in the art without departing from the scope and spirit of the invention as expressed in the appended claims.

Referring to the drawings, Fig. 1 represents a sectional elevation of the valve structure. Fig. 2 is a plan of the same, and Figs. 3, 4 and 5 are detailed views of parts thereof.

In the drawings the numeral 1 indicates the body of a valve casing having a central chamber 2, at one end of which is supported a pressure responsive diaphragm 3 retained in position by means of a top cover 4 secured to the casing and clamping the margin of the diaphragm as by screws 5. The upper end of the casing chamber is suitably enlarged to accommodate the free movement of the diaphragm.

The top cover is provided with an extension 6 forming a chamber 7 in axial extension of the casing chamber 2, within which is positioned a seat 8 bearing upon the outer surface of the diaphragm and supporting one end of a tension spring 9. The other end of the tension spring is retained by a cap 10 having screw threaded engagement with the end of the cover extension 6, thereby providing for the adjustment of the tension of the spring 9 against the diaphragm.

An inlet conduit 11 is positioned in an opening in the lateral wall of the casing, the conduit extending therethrough into the chamber 2 and having its inner end closed. The conduit 11 is preferably removable, and is secured in normal position by means of a cap 12, bearing in endward abutment upon the conduit 11 and secured to the casing by suitable means as by bolts (not shown). The cap 12 is provided with a bore 13 communicating with the bore 14 of the inlet conduit, and preferably threaded for the attachment of piping 15 leading to a source of refrigerant fluid.

The inwardly extending portion of the conduit 11 is provided with a lateral aperture 16 opening from the bore of the conduit into the chamber 2, and preferably tapered to form a valve seat. Operatively associated with the seat 16 is a valve 17 having a conical portion entering the valve seat. The valve 17 is carried by a movable support 18 in the form of a yoke extending longitudinally of the chamber 2, having one end portion 19 in abutment with the diaphragm 3 in opposition to the seat plate 8, and having its opposite end 20 supporting the valve 17, preferably with the inlet conduit 11 extending through the central aperture formed in the yoke. The yoke 18 is suitably constructed for guidance upon the side walls of the chamber in its longitudinal movement therein by the side members 21 and guide wings 22 adapted for sliding contact with the wall of the chamber.

The lower end portion 20 of the valve support is provided with an opening 23 therethrough, positioned axially opposite the valve seat 16, and through which extends the stem of the valve 17, the diameter of the stem being substantially less than the diameter of the opening and permitting free lateral movement of the valve stem within the opening. The valve 17 is supported upon the yoke 18 by means of a flange 24 formed on the valve and abutting the outer side of the end portion 20 of the yoke, the abutting flat surfaces of the yoke end and the flange being arranged in perpendicular relation to the axis of the valve and its seat, so that the valve may slide laterally thereupon while in constant axial or longitudinal relation to the yoke. The valve flange 24 is maintained in constant abutment with the yoke by means of a tension spring 25, bearing outwardly upon the flange 24 and retained at its outer end by the bearing plug 26, preferably screw threaded into the end of the casing 1 and forming a closure of the chamber 2. The casing 1 is provided with an outlet opening 27 in communication with the expansion coils of the refrigerating system by means of a pipe connection 28.

By this construction it will be obvious that with the movement of the yoke 18 by the diaphragm 3, under the influence of the pressure within the chamber 2, the valve 17 will be actuated longitudinally in constant relation to the diaphragm 3, but that any lateral variation from axial alinement between the valve and its seat is readily and automatically adjusted by the shifting of the valve flange across the face of the abutting end of the yoke. By this means the axes of the valve and its seat are always parallel, and the valve finds its seat without wearing friction and in complete closure thereof.

We claim as our invention:

1. In an automatic expansion valve, a centrally open guide yoke laterally supported for longitudinal movement, pressure responsive means at one end of said yoke operable to move said yoke longitudinally, the other end of said yoke having a plane outer surface perpendicular to the longitudinal axis of said yoke and having an axial opening through said plane surface, a stationary conduit extending into said central opening in said yoke and having an aperture forming a conical valve seat having its axis parallel to the axis of said yoke and opening toward said axial opening in said yoke end, a valve having a conically formed end in operative controlling relation to said valve seat, said valve extending through said axial opening in said yoke end in laterally spaced relation thereto, a flange formed on said valve outwardly of said yoke end and having a plane surface adapted for free abutment with the plane surface of said yoke, said abutment being effective to maintain the axis of said conical valve end in parallel relation to the axis of said yoke and said valve seat while permitting relative lateral movement of said valve, and resilient means tending to move said valve into said valve seat and to maintain the laterally slidable abutment between said flange and said yoke end.

2. In an automatic expansion valve, a centrally open longitudinally movable guide yoke having an end portion outwardly provided with a plane surface perpendicular to the axis of said yoke, said end portion having an axial opening through said plane surface, and a valve extending through said axial opening and laterally movable therewithin, said valve having a flange in outward laterally free abutment with said plane surface, said abutment being effective to maintain the axis of said valve in constant parallel relation to the axis of said yoke while permitting relative lateral movement therebetween.

3. In a gas pressure regulator, in combination, a body having a working pressure chamber and gas exit nozzle therein, a regulating valve for said nozzle mounted in an unguided manner on the body for movement toward and from the nozzle, an independent actuating member for said valve having contact therewith and movable toward and from the valve and freely shiftable transversely to the direction of its movement while engaging the valve and comprising a yoke straddling the nozzle and coacting with the valve at diametrically opposite the points thereof.

4. In a gas regulator, a body provided with a chamber for the working pressure of the gas, a gas nozzle in said chamber, and a freely floating resiliently supported valve cooperating with said nozzle and mounted for free movement angularly to its path of travel toward said nozzle.

5. In a gas regulator, a body provided with a chamber for the working pressure of the gas, a gas nozzle in said chamber, a freely floating valve cooperating with said nozzle, a support for said valve permitting universal movement of said valve relative to the nozzle, and an unguided valve actuating member controlling the operation of said valve.

6. In a gas regulator, a body provided with a chamber for the working pressure of the gas, a gas nozzle in said chamber, a freely floating valve cooperating with said nozzle and movable angularly relative to its path of travel, and a freely floating valve actuating member coacting with said valve to control its cooperation with the nozzle.

In witness whereof we have hereunto attached our signatures.

JOHN C. SCOVEL, Jr.
WILLIAM J. O'BRIEN.